United States Patent
Suzuki

(10) Patent No.: US 7,978,255 B2
(45) Date of Patent: Jul. 12, 2011

(54) SOLID-STATE IMAGE SENSOR AND IMAGE-CAPTURING DEVICE

(75) Inventor: Satoshi Suzuki, Tokyo (JP)

(73) Assignee: Nikon Corporation, Tokyo (JP)

( * ) Notice: Subject to any disclaimer, the term of this patent is extended or adjusted under 35 U.S.C. 154(b) by 471 days.

(21) Appl. No.: 12/285,789

(22) Filed: Oct. 14, 2008

(65) Prior Publication Data

US 2009/0122171 A1  May 14, 2009

Related U.S. Application Data

(60) Provisional application No. 60/960,747, filed on Oct. 11, 2007.

(30) Foreign Application Priority Data

Oct. 11, 2007 (JP) ................................. 2007-265388
Dec. 28, 2007 (JP) ................................. 2007-339754

(51) Int. Cl.
*H04N 5/232* (2006.01)

(52) U.S. Cl. ........ 348/350; 348/340; 348/294; 348/345; 348/222.1; 348/315; 359/626; 350/208.1

(58) Field of Classification Search .......................... None
See application file for complete search history.

(56) References Cited

U.S. PATENT DOCUMENTS 7,291,826 B2 * 11/2007 Vaillant ....................... 250/214.1

FOREIGN PATENT DOCUMENTS

| JP | B2-2604890 | | 4/1997 |
|---|---|---|---|
| JP | B2-2776810 | | 7/1998 |
| JP | 2003244712 A | * | 8/2003 |
| JP | A-2003-244712 | | 8/2003 |
| JP | A-2006-261929 | | 9/2006 |

* cited by examiner

*Primary Examiner* — Jason Chan
*Assistant Examiner* — Yih-Sien Kao
(74) *Attorney, Agent, or Firm* — Oliff & Berridge, PLC

(57) ABSTRACT

A solid-state image sensor includes: a plurality of image-capturing pixels, each equipped with a first micro-lens used to condense light; and a plurality of focus detection pixels engaged in focus detection, each equipped with a second micro-lens used to condense light; the plurality of image-capturing pixels and the plurality of focus detection pixels being disposed in a two-dimensional array. The first micro-lens and the second micro-lens are formed so that a light condensing position at which light is condensed via the second micro-lens is set further toward a micro-lens side than the light condensing position at which light is condensed via the first micro-lens.

14 Claims, 16 Drawing Sheets

(AF PIXEL 20B)

(AF PIXEL 20B)

(AF PIXEL 20B IN THE RELATED ART)

FIG.11

|  | IMAGE-CAPTURING PIXEL 20A (LIGHT CONDENSING POSITION P1) | AF PIXEL 20B (LIGHT CONDENSING POSITION P2) |
|---|---|---|
| MICRO-LENS THICKNESS (IDENTICAL MICRO-LENS SHAPE IN PLAN VIEW) | SMALL | LARGE |
| MICRO-LENS DIAMETER (SAME MICRO-LENS THICKNESS) | LARGE | SMALL |
| MICRO-LENS MATERIAL REFRACTIVE INDEX (IDENTICAL MICRO-LENS SHAPE) | SMALL | LARGE |

FIG.12

| | PHASE DIFFERENCE AF SIGNAL EFFECTIVENESS FACTOR |
|---|---|
| MICRO-LENS STRUCTURE OPTIMAL FOR IMAGE-CAPTURING | 4.3 |
| MICRO-LENS DIAMETER REDUCED BY 10% | 10.9 |
| MICRO-LENS THICKNESS INCREASED BY 10% | 9.7 |

(MICRO-LENSES 41 ASSUME A CIRCULAR SHAPE IN PLAN VIEW)

SOLID-STATE IMAGE SENSOR AND IMAGE-CAPTURING DEVICE

INCORPORATION BY REFERENCE

The disclosures of the following priority applications are herein incorporated by reference: Japanese Patent Application No. 2007-265388 filed Oct. 11, 2007, US Provisional Patent Application No. 60/960,747, Oct. 11, 2007, and Japanese Patent Application No. 2007-339754 filed Dec. 28, 2007.

BACKGROUND OF THE INVENTION

1. Field of the Invention

The present invention relates to a solid-state image sensor and an image-capturing device equipped with the solid-state image sensor.

2. Description of Related Art

Today, video cameras and electronic cameras often come equipped with an AF (autofocus) function as a standard feature. Such a camera normally includes a solid-state image sensor constituted with a CCD or a CMOS. The solid-state image sensor includes a plurality of pixels equipped with photoelectric conversion units that generate signal charges in correspondence to the amount of incoming light, disposed in a two-dimensional array. On-chip micro-lenses are disposed on the light-entry side of the photoelectric conversion units. The micro-lenses are disposed in order to condense light that would otherwise enter pixel areas Other than the photoelectric conversion units onto the photoelectric conversion units and thus increase the amount of light entering the photoelectric conversion units.

A single lens reflex electronic camera often includes a focus detector adopting the split-pupil phase difference method, provided as a separate unit in addition to the solid-state image sensor engaged in the image-capturing operation so as to detect the focusing state quickly. However, during the focus detection, no subject light enters the image sensor and, for this reason, no live view image display is provided on the compact monitor installed at the rear side of the camera. While the live view image is displayed, on the other hand, no subject light enters a focus detector that detects the focusing state through the split-pupil phase difference method. This means that focus detection cannot be executed via the focus detector during live view image display. While technologies whereby focus detection is executed through the contrast detection method (peak method) based upon signals provided from the solid-state image sensor have been proposed, focus detection cannot be executed quickly through such a method. To address this issue, Japanese Laid Open Patent Publication No. 2003-244712 and Japanese Laid Open Patent Publication No. 2006-261292 each disclose a solid-state image sensor that includes built-in focus detection pixels to be used in focus detection through the split-pupil phase difference method.

SUMMARY OF THE INVENTION

There is still an issue that must be addressed effectively in the technologies in the related art described above whereby the solid-state image sensor used in image-capturing operation includes built-in focus detection pixels to be engaged in focus detection through the split-pupil phase difference method, in that the level of focus detection performance achieved via such a solid-state image sensor is bound to be lower.

According to the 1st aspect of the present invention, a solid-state image sensor comprises: a plurality of image-capturing pixels, each equipped with a first micro-lens used to condense light; and a plurality of focus detection pixels engaged in focus detection, each equipped with a second micro-lens used to condense light; the plurality of image-capturing pixels and the plurality of focus detection pixels being disposed in a two-dimensional array. The first micro-lens and the second micro-lens are formed so that a light condensing position at which light is condensed via the second micro-lens is set further toward a micro-lens side than the light condensing position at which light is condensed via the first micro-lens.

According to the 2nd aspect of the present invention, in the solid-state image sensor according to the 1st aspect, it is preferred that the plurality of image-capturing pixels and the plurality of focus detection pixels each include a photoelectric converter; the photoelectric converter of each of the plurality of image-capturing pixels and the photoelectric converter of each of the plurality of focus detection pixels are disposed on a single plane; and the first micro-lens and the second micro-lens are disposed on a single plane.

According to the 3rd aspect of the present invention, in the solid-state image sensor according to the 1st aspect, it is preferred that the plurality of image-capturing pixels and the plurality of focus detection pixels each include a photoelectric converter; the plurality of focus detection pixels each include a light shield member with an opening formed therein; the light shield member is disposed between the photoelectric converter and the second micro-lens; and the light condensing position at which light is condensed via the second micro-lens is set on a plane on which the light shield member is disposed.

According to the 4th aspect of the present invention, in the solid-state image sensor according to the 1st aspect, it is preferred that the light condensing position of the second micro-lens is adjusted toward the micro-lens side relative to the light condensing position of the first micro-lens by setting a greater curvature for a lens surface of the second micro-lens than a curvature of a lens surface of the first micro-lens.

According to the 5th aspect of the present invention, in the solid-state image sensor according to the 4th aspect, it is preferred that the greater curvature of the lens surface of the second micro-lens than the curvature of the lens surface of the first micro-lens is set by setting a lens thickness of the second micro-lens to be greater than a lens thickness of the first micro-lens.

According to the 6th aspect of the present invention, in the solid-state image sensor according to the 5th aspect, it is preferred that, provided that a uniform lens diameter is assumed, a ratio of the lens thickness of the second micro-lens and the lens thickness of the first micro-lens is set equal to or greater than 1.1 and less than 1.4.

According to the 7th aspect of the present invention, in the solid-state image sensor according to the 4th aspect, it is preferred that the greater curvature of the lens surface of the second micro-lens than the curvature of the lens surface of the first micro-lens is set by setting a lens diameter of the second micro-lens to be smaller than a lens diameter of the first micro-lens.

According to the 8th aspect of the present invention, in the solid-state image sensor according to the 7th aspect, it is preferred that, provided that a uniform lens thickness is assumed, a ratio of the lens diameter of the second micro-lens and the lens diameter of the first micro-lens is set equal to or greater than 0.95 and less than 1.0.

According to the 9th aspect of the present invention, in the solid-state image sensor according to the 4th aspect, it is preferred that the greater curvature of the lens surface of the second micro-lens than the curvature of the lens surface of the first micro-lens is set by forming the second micro-lens in a circular shape in a plan view and forming the first micro-lens in a rectangular shape in a plan view.

According to the 10th aspect of the present invention, in the solid-state image sensor according to the 4th aspect, it is preferred that the greater curvature of the lens surface of the second micro-lens than the curvature of the lens surface of the first micro-lens is set by forming the second micro-lens in a polygonal shape with at least eight sides in a plan view and forming the first micro-lens in a polygonal shape with seven or fewer sides in a plan view.

According to the 11th aspect of the present invention, in the solid-state image sensor according to the 1st aspect, it is preferred that the light condensing position of the second micro-lens is adjusted toward the micro-lens side relative to the light condensing position of the first micro-lens by setting a greater refractive index for a lens material constituting the second micro-lens than a refractive index for a lens material constituting the first micro-lens.

According to the 12th aspect of the present invention, in the solid-state image sensor according to the 1st aspect, it is preferred that with L1 representing a thickness of the micro-lens and L2 representing a distance between the micro-lens and a light-receiving surface of a pixel at which the micro-lens is disposed, a ratio L2/L1 is set to different values for the first micro-lens and the second micro-lens so that the light condensing position of the second micro-lens is adjusted further toward the micro-lens side than the light condensing position of the first micro-lens.

According to the 13th aspect of the present invention, in the solid-state image sensor according to the 12th aspect, it is preferred that the ratio L2/L1 for the second micro-lens is set equal to or greater than 3.72 and equal to or less than 3.98.

According to the 14th aspect of the present invention, an image-capturing device comprises: a solid-state image sensor according to the 1st aspect; a photographic lens; an image forming unit that forms image information based upon outputs from the plurality of image-capturing pixels; and a focus detection unit that executes focus detection through a split-pupil phase difference method based upon outputs from the plurality of focus detection pixels.

BRIEF DESCRIPTION OF THE DRAWINGS

FIG. 11 presents a list of methods that may be adopted in order to alter the light condensing position;

FIG. 12 presents the results of optical simulations pertaining to phase difference AF signal effectiveness factors, each corresponding to one of three different types of micro-lenses 41;

DESCRIPTION OF PREFERRED EMBODIMENT

Figure 1:
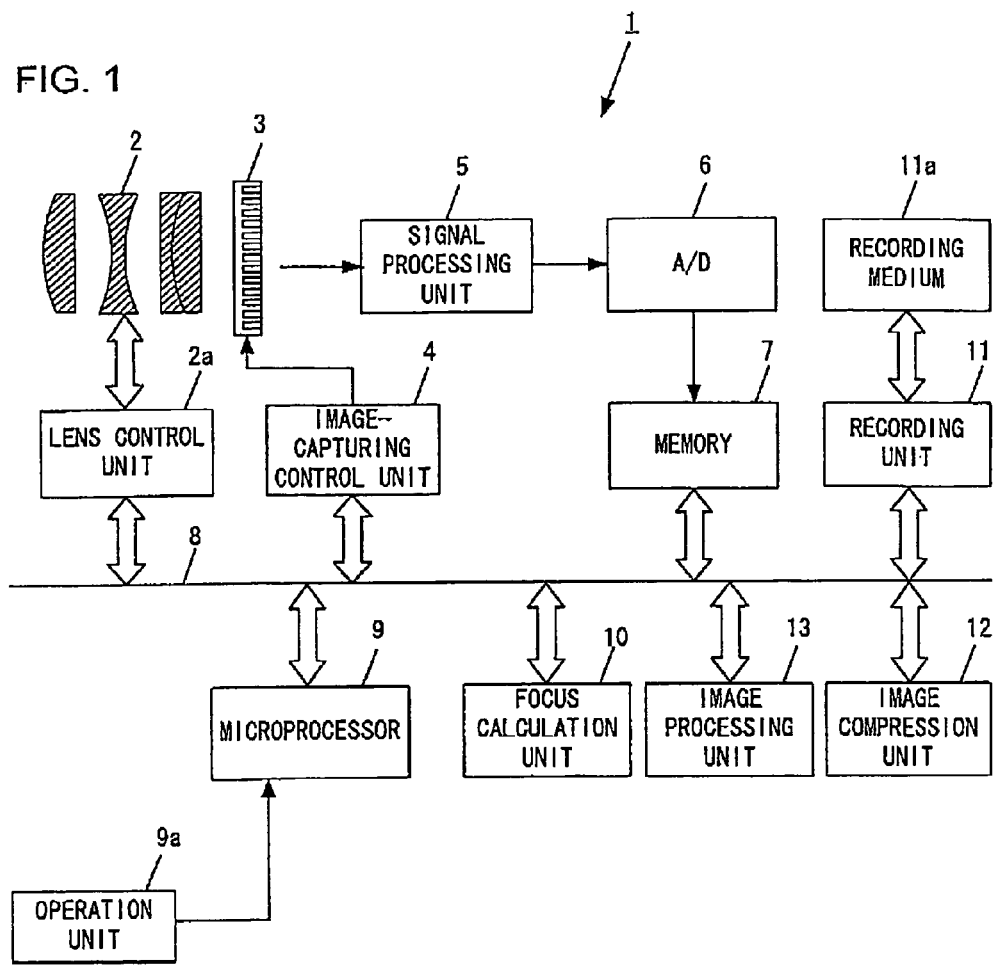
FIG. 1 is a block diagram schematically illustrating the structure of an electronic camera 1 achieved as an embodiment of the image-capturing device according to the present invention.

The following is a description of the best mode for carrying out the present invention, given in reference to the drawings. FIG. 1 is a block diagram schematically illustrating the structure of an electronic camera 1 achieved as an embodiment of the image-capturing device according to the present invention. A photographic lens 2, constituting an optical system via which an image of a subject is formed, is mounted at the electronic camera 1. The photographic lens 2 includes a focusing lens and an aperture which are driven by a lens control unit 2a. At the electronic camera 1, a solid-state image sensor 3 at which the subject image formed via the photographic lens 2 undergoes photoelectric conversion is installed.

As the solid-state image sensor 3 is driven in response to a command issued by an image-capturing control unit 4, electrical signals corresponding to the subject image are output from the solid-state image sensor. The signals output from the solid-state image sensor 3 include image-capturing signals used to form image signals representing the subject image and focus detection signals used to detect the state of focus adjustment at the photographic lens 2. It is to be noted that while the solid-state image sensor may also output an exposure control signal, this signal does not bear any relevance to the present invention and thus its explanation is not provided.

The image-capturing signals and the focus detection signals are processed at a signal processing unit and an A/D conversion unit 6, and the signals having undergone the processing are temporarily stored into a memory 7. The memory 7 is connected to a bus 8. The lens control unit 2a, the image-capturing control unit 4, a microprocessor 9, a focus calculation unit 10, a recording unit 11, an image Compression unit 12, an image processing unit 13 and the like are also connected to the bus 8. An operation unit 9a such as a shutter release button is connected to the microprocessor 9. In addition, a recording medium 11a is detachably loaded into the recording unit 11, and data are recorded into the recording medium 11a and data in the recording medium 11a are reproduced via the recording unit 11.

The focus detection signals having been stored into the memory 7 on a temporary basis are then provided via the bus 8 to the focus calculation unit 10. Based upon the focus detection signals, the focus calculation unit 10 calculates the focus adjustment state, determines the shift amount indicating the extent to which the photographic lens 2 is to be driven and provides the value to the lens control unit 2a. Namely, the focus calculation unit 10 outputs a detection signal indicating the focus adjustment state to the lens control unit 2a. The lens control unit 2a, in turn, adjusts the focusing condition by driving the photographic lens 2 to a specific position based upon the detection signal indicating the focus adjustment state.

Figure 2:
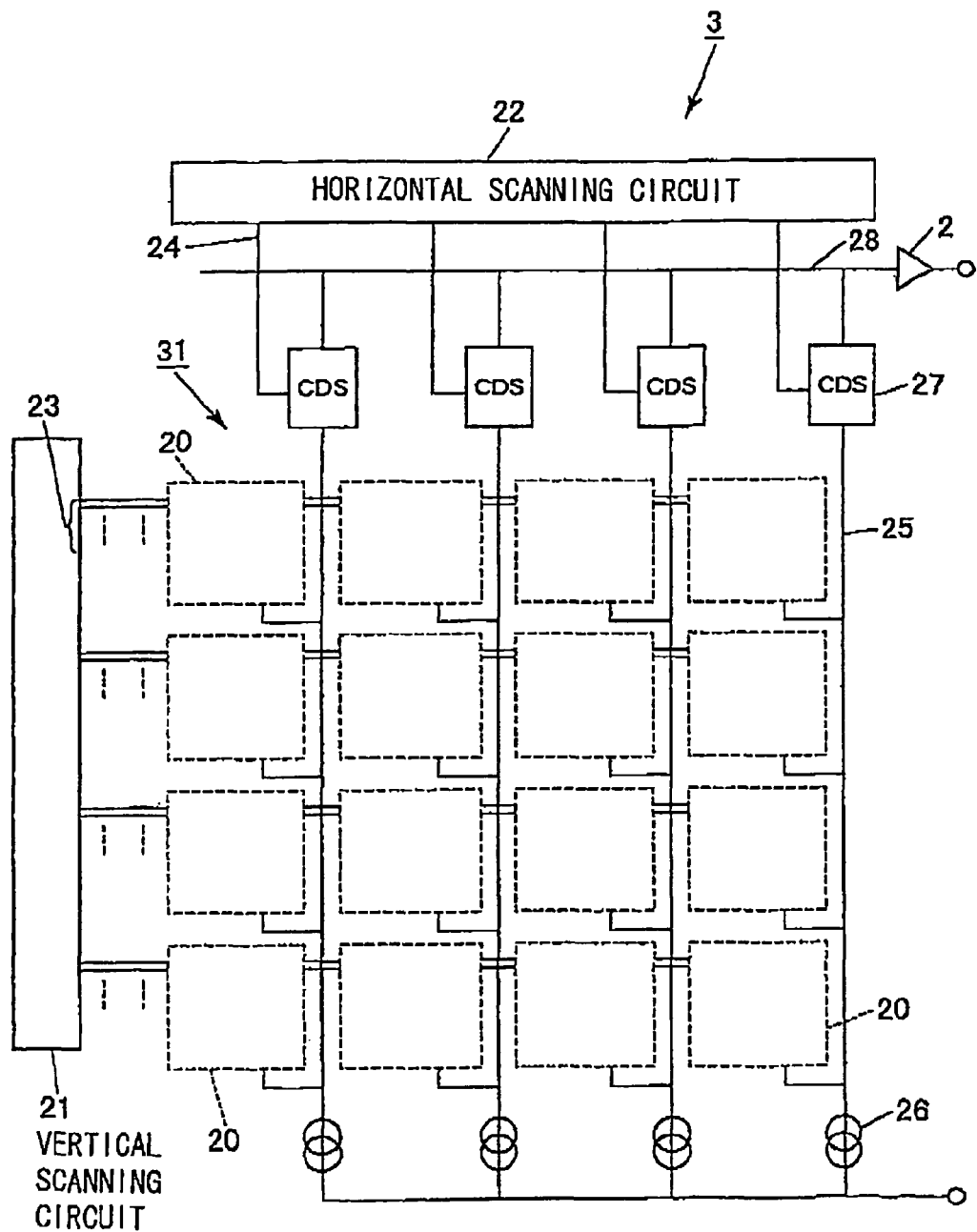
FIG. 2 is a circuit diagram schematically illustrating the structure of the solid-state image sensor 3.

FIG. 2 is a circuit diagram schematically illustrating the structure of the solid-state image sensor 3 in FIG. 1. The solid-state image sensor 3 includes a plurality of pixels 20 disposed in a two-dimensional array and peripheral circuits through which signals from the pixels 20 are output. Reference numeral 31 in FIG. 2 indicates an effective pixel area (image-capturing area) where the pixels 20 are disposed in the two-dimensional array. The pixels 20 will normally be disposed in a two-dimensional pattern along two directions perpendicular to each other, e.g., the longitudinal direction (columnar direction) and the lateral direction (row direction). While FIG. 2 shows sixteen pixels 20 in a four (lateral) row by four (longitudinal) row array to simplify the illustration, the solid-state image sensor 3 in the embodiment actually includes a far greater number of pixels than that shown in FIG. 2. However, the present invention does not impose any particular restrictions with regard to the number of pixels.

The solid-state image sensor 3 in the embodiment includes image-capturing pixels 20A (see FIG. 4) that generate image-capturing signals and focus detection pixels (hereafter may be referred to as "AF pixels") 20B (see FIG. 4) that generate focus detection signals (hereafter referred to as "AF signals"). However, the pixels shown in FIG. 2 are assigned with reference numeral 20, without distinguishing one type of pixel from the other. The specific circuit structures and structural features of the various types of pixels are to be described in detail later. A pixel 20 outputs an image-capturing signal or a focus detection signal in response to a drive signal originating from a peripheral circuit.

The peripheral circuits include a vertical scanning circuit 21, a horizontal scanning circuit 22, drive wirings 23 and 24 connected to the scanning circuits, vertical output lines 25 via which electrical signals from the pixels 20 are received, constant current sources 26 and correlated double sampling circuits (CDS circuits) 27 connected to the vertical output lines 25, a horizontal signal line 28 at which signals output from the correlated double sampling circuits are received, an output amplifier 29 and the like.

In response to a command issued by the image-capturing control unit 4 in the electronic camera 1, the vertical scanning circuit 21 and the horizontal scanning circuit 22 output drive signals to the drive wirings 23 and 24 respectively. Each pixel 20 is driven by a drive signal from the vertical scanning circuit 21, taken in via a specific drive wiring 23, and outputs an image-capturing signal or an AF signal to the corresponding vertical output line 25. The vertical scanning circuit 21 outputs a plurality of drive signals and a plurality of drive wirings 23 are installed in correspondence. It is to be noted that the drive wirings 23 connected to the vertical scanning circuit 21 are connected to the gate electrodes of the MOS transistors disposed at the pixels. The signals output from the pixels 20 undergo a specific type of noise removal at the COS circuits 27 and are output to the outside via the horizontal output line 28 and the output amplifier 29 based upon drive signals provided from the horizontal scanning circuit 22.

Figure 3:
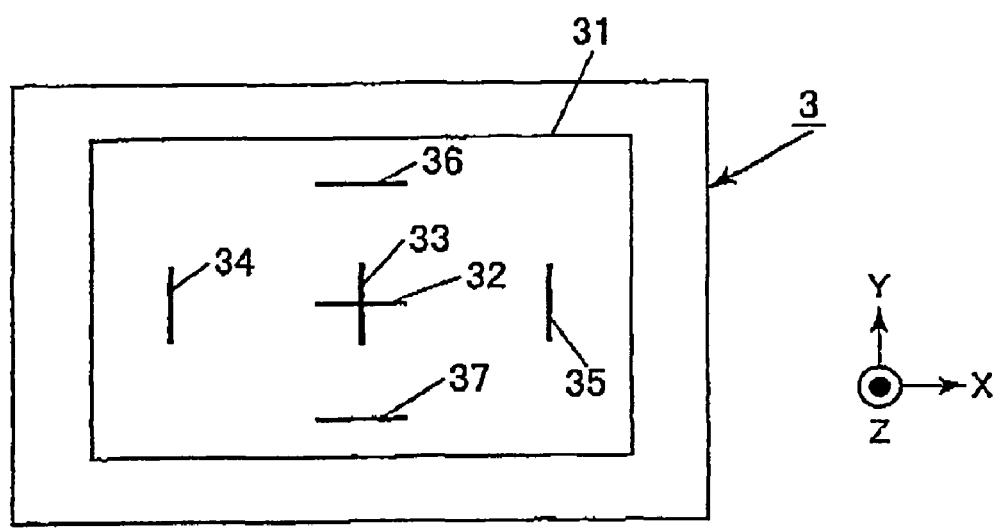
FIG. 3 is a schematic plan view of the solid-state image sensor 3.

FIG. 3 is a plan view schematically illustrating the solid-state image sensor 3 (specifically its effective pixel area 31) in FIG. 1. As shown in FIG. 3, at the effective pixel area 31 of the solid-state image sensor 3 in the embodiment, two focus detection areas 32 and 33 located at the center and crossing each other, two focus detection areas 34 and 35 located to the left and to the right and two focus detection areas 36 and 37 located on the upper side and on the lower side relative to the center of the effective pixel area are set. However, the present invention is not limited to this example. Focus detection areas may be set in a pattern other than this or AF pixels may be cyclically and reiteratively disposed over the entire effective pixel area 31, instead.

It is to be noted that an X axis, a Y axis and a Z axis extending perpendicular to one another are defined as shown in FIG. 3. The direction indicated by the arrow along the x-axis is referred to as the +X direction or the +X side with the opposite direction referred to as the −X direction or the −X side. The two opposite directions running along the Y axis, too, are similarly referred to. The XY plane is parallel with the image-capturing plane (light-receiving surface) of the solid-state image sensor 3. The pixels 20 are set side-by-side in rows that extend along the x-axis and in columns that extend along the y-axis. It is to be noted that incoming light from the photographic lens 2 enters from above the drawing sheet on which FIG. 3 is drawn and advances downward into the figure. This arrangement also applies to later drawings.

Figure 4:
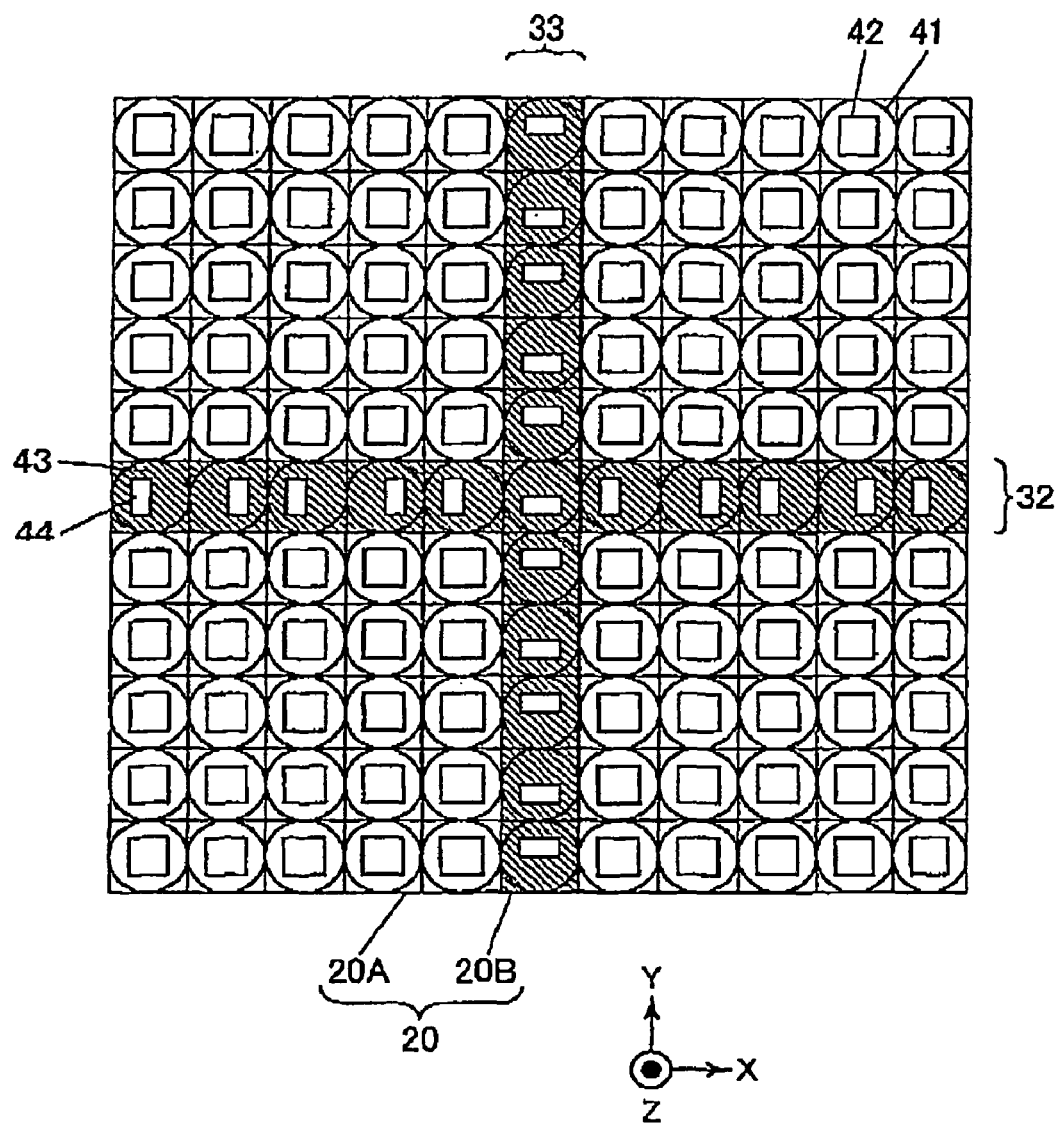
FIG. 4 is a schematic enlarged illustration of the pixel arrangement assumed over an area where the focus detection areas 32 and 33 intersect each other.

FIG. 4 schematically illustrates how pixels are arranged over an area where the focus detection areas 32 and 33 in FIG. 3 intersect each other in an enlarged view. While the solid-state image sensor 3 includes a single type of image-capturing pixels 20A and 4 types of AF pixels 20B with different light-receiving areas, where the incoming light is received, defined therein, the following description is applicable to all types of AF pixels unless specially noted.

Each pixel 20 includes disposed therein a photoelectric conversion unit 42 and a micro-lens 41, via which the incoming light is guided to the photoelectric conversion unit 42. It is to be noted that while the photoelectric conversion units at the AF pixels 20B assume a shape identical to that of the photoelectric conversion units 42 at the image-capturing pixels 20A, FIG. 4 shows a light shield film 43 with an opening 44 disposed over the photoelectric conversion unit instead of the photoelectric conversion unit at each AF pixel 20B. Depending upon the position of the opening 44, the area over which the incoming light is guided to the photoelectric conversion unit of the AF pixel 20B is defined.

Figure 5:
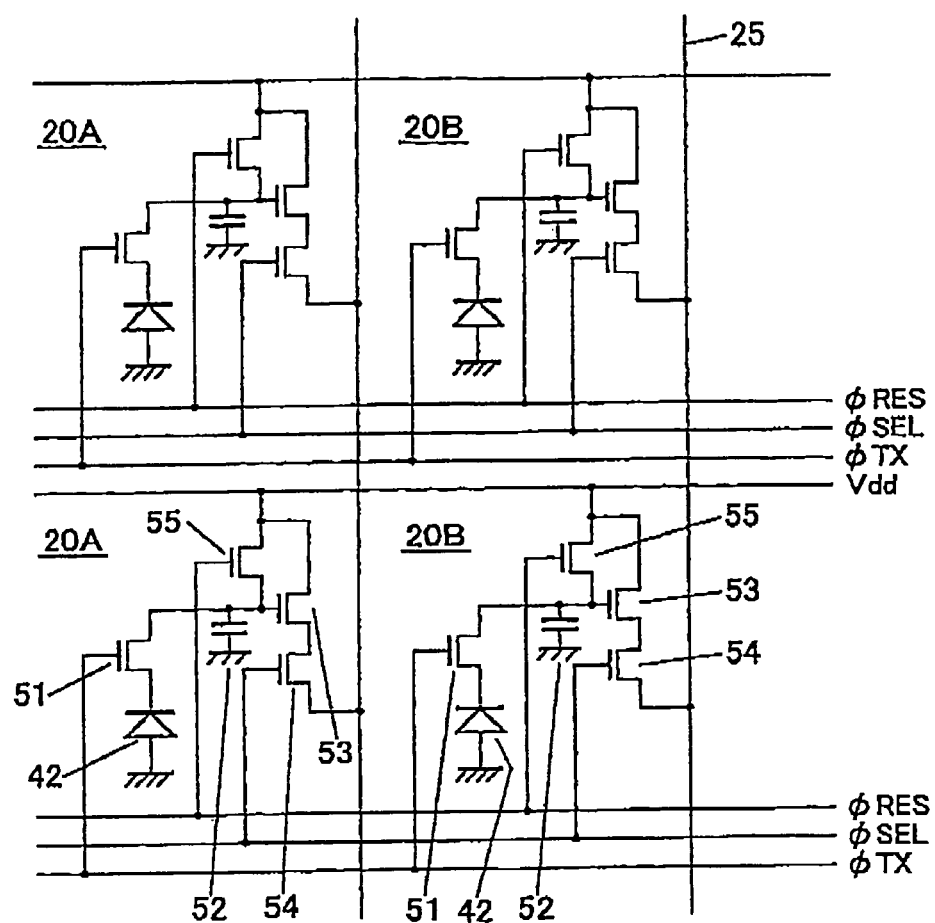
FIG. 5 is a circuit diagram for 2×2 pixels 20 among numerous pixels 20 disposed at the solid-state image sensor 3.

FIG. 5 is a circuit diagram pertaining to a pixel area with 2×2=4 pixels 20 present therein, which includes part of the focus detection area 33 at the solid-state image sensor 3 constituted of numerous pixels 20. Namely, FIG. 5 presents a circuit diagram pertaining to two AF pixels 20B and two image-capturing pixels 20A. The pixels 20 (the image-capturing pixels 20A and the AF pixels 20B) in the embodiment all assume identical circuit structures. Each pixel 20 is constituted with a photoelectric conversion unit (photo diode) 42 at which an electrical charge corresponding to the incoming light is generated, a floating diffusion 52 that takes in and accumulates the electrical charge, a pixel amplifier transistor 53 that outputs a signal corresponding to the potential at the floating diffusion 52, a transfer transistor 51 that transfers the electrical charge from the photoelectric conversion unit 42 to the floating diffusion 52, are set transistor 55 that resets the voltage at the floating diffusion 52 and a selector transistor 54 via which the particular pixel 20 is selected.

As described above, the pixels 20 each include a plurality of transistors via which the electrical signal corresponding to the electrical charge is generated and output. Such a circuit structure assumed at the pixels 20 is a standard circuit structure for pixels each constituting a structural unit in a CMOS solid-state image sensor.

The transfer transistor 51, the pixel amplifier transistor 53, the reset transistor 55 and the selector transistor 54 in the embodiment are each constituted with an NMOS transistor. The floating diffusion 52 is actually constituted with an n-type impurity semiconductor region FD formed at a p-type silicon substrate, an internal wiring electrically connecting the FD to the gate electrode of the pixel amplifier transistor 53 and the gate electrode of the pixel amplifier transistor 53.

It is to be noted that the gate electrodes of the transfer transistors 51 at the individual pixels 20 in each pixel row in FIGS. 2 and 5 are commonly connected to a drive wiring 23, and a drive signal ØTX is provided from the vertical scanning circuit 21 to the pixels 20 in the particular row via the drive wiring 23. The gate electrodes of the selector transistor 54 at the individual pixels 20 in each pixel row are commonly connected to the corresponding drive wiring 23 and a drive signal ØSEL is provided to the pixels from the vertical scanning circuit 21 via the drive wiring 23. The gate electrodes at the reset transistors 55 at the individual pixels 20 in each row are commonly connected to the corresponding drive wiring 23 and a drive signal ØRES is provided to the pixels from the vertical scanning circuit 21 via the drive wiring 23. The drive wirings 23 connected to the vertical scanning circuit 21 are laid out so that they extend along the row direction (X direction) parallel to one another.

Figure 6:
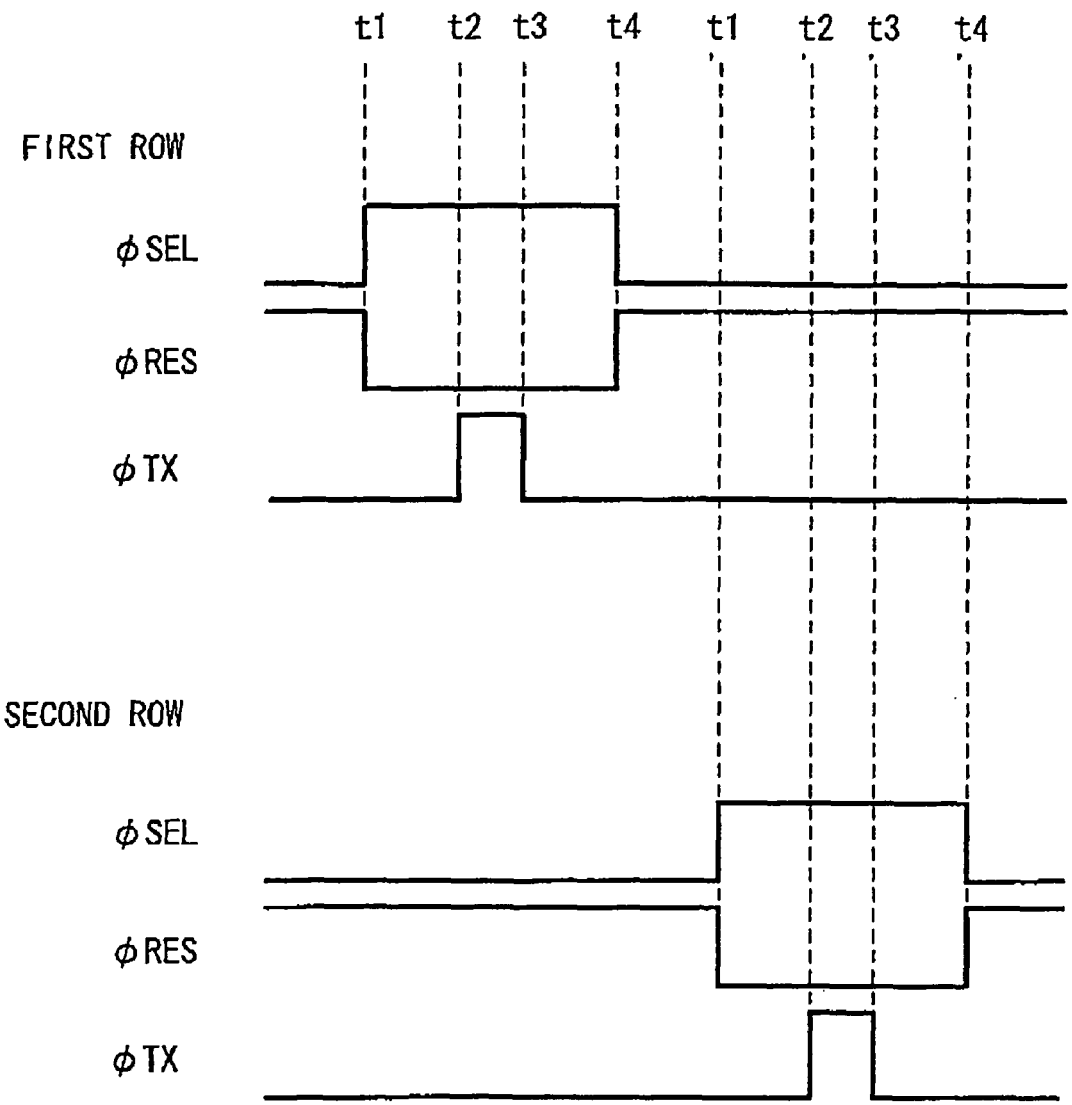
FIG. 6 presents a timing chart of an operation executed at the solid-state image sensor 3.

FIG. 6 presents a timing chart of an operation executed at the solid-state image sensor 3. Through the operation shown in the timing chart, the image-capturing signals and the AF signals are output in units of individual rows. However, only the AF signals may be output by specifically selecting only the AF pixels in the focus detection area.

Prior to a time point t1 in FIG. 6, the drive signal ØRES sustains high level and the reset transistors 55 remain in an ON state. The floating diffusions 52 are thus reset to a reference level (e.g., the dark level). At the time point t1, the drive signal ØRES is switched to low level. As a result, the reset transistors 55 enter an OFF state and the reset level of the floating diffusions 52 are sustained in the OFF state In addition, the drive signal ØSEL for the row to be selected (the first row in FIG. 6) is switched to high level and the selector transistors 54 are set to the ON state at the time point t1. Thus, the individual pixels in the selected row become connected to the corresponding vertical output lines 25 and electrical charges corresponding to the reference level signals output from the floating diffusions 52 are output and accumulated into the CDS circuits 27 from the pixel amplifier transistors 53 via the vertical signal lines 25.

At a time point t2, the drive signal ØTX is switched to high level. Then at a time point t3, the drive signal ØTX is reset to low. As a result, the electrical charges having accumulated at the photoelectric conversion units 42 are transferred to the floating diffusions 52, and signals that include the electrical charge signals superimposed on the reference level signals are output to the CDS circuits 27 from the pixel amplifier transistors 53 via the vertical output lines 25. Subsequently, image signals and AF signals, obtained via the CDS circuits 27 by determining the differences between the most recently output signals and the earlier reference level signals, are output.

At a time point t4, the drive signal ØSEL is set to low level and the selector transistors 54 are turned off. As a result, the connection between the individual pixels 20 in the selected row and the corresponding vertical output lines 25 becomes cut off. Subsequently, the next row (second row) is selected and image signals and AF signals are output with the drive signals for the various transistors controlled at time points t1' through t4' in a similar manner. The image signals or AF signals having been read out first undergo a specific type of processing and then are stored into the memory 7. If focus detection processing needs to be executed, the AF signals are read out from the memory 7 and a specific type of processing is executed on the AF signals. When an image is to be brought up on display, the image signals read out from the memory 7 undergo specific processing.

Figure 7C:
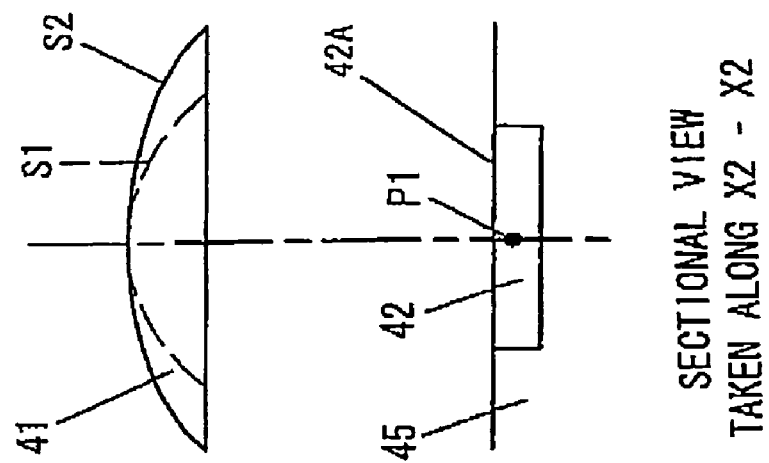
FIGS. 7A, 7B and 7C respectively present a plan view, a sectional view taken through X1-X1 and a sectional view taken through X2-X2, each schematically illustrates the essential part of an image-capturing pixel 20A.
Figure 7B:
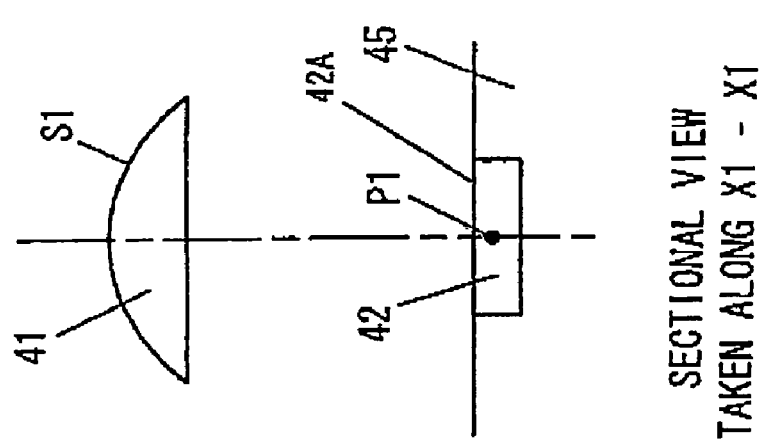
Figure 7A:
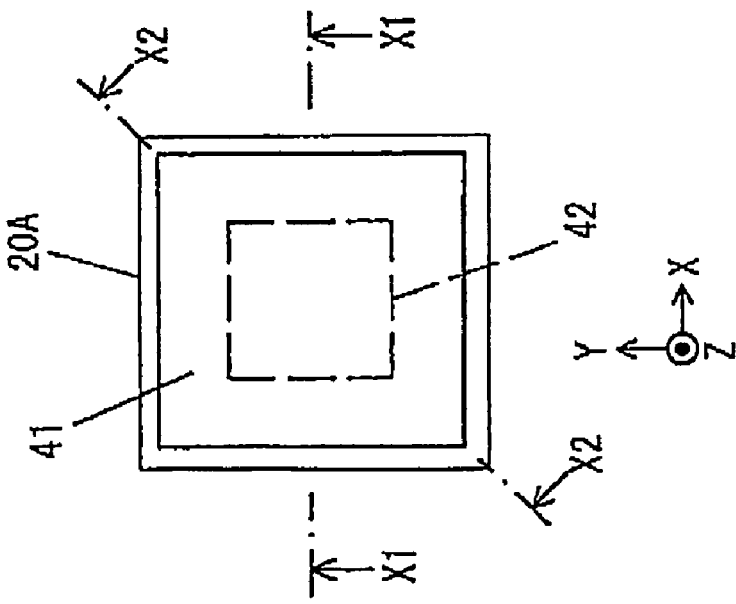

FIGS. 7A, 7B and 7C respectively present a plan view, a sectional view taken along X1-X1 in FIG. 7A and a sectional view taken along X2-X2 in FIG. 7A, each schematically illustrating the essential part of an image-capturing pixel 20A. The image-capturing pixel 20A includes the photoelectric conversion unit 42 and an on-chip micro-lens 41 formed over the photoelectric conversion unit 42. While various layers, including a color filter, are formed between the micro-lens 41 and the photoelectric conversion unit 42, they are not shown in FIGS. 7A~7C.

As shown in FIGS. 7A~7C, the micro-lens 41 assumes a rectangular shape in a plan view (see the shape of the micro-lens 41 in the plan view), the curvature of a curved micro-lens surface S2 in the X2-X2 section is smaller than the curvature of a curved micro-lens surface S1 in the X1-X1 section taken along the diagonal direction. The light condensing position P1 at which light is condensed via the micro-lens 41 of the image-capturing pixel 20A is either right on a light-receiving surface 42A or closer to the substrate 45 relative to the light-receiving surface 42A. In the example presented in FIGS. 7B and 7C, the light condensing position P1 is assumed at a point closer to the substrate 45 relative to the light-receiving surface 42A. The center of the photoelectric conversion unit 42 and the center of the micro-lens 41 are aligned with each other and thus, a light flux from an exit pupil area, which is not substantially offset from the center of the exit pupil of the photographic lens 2, is received and undergoes the photoelectric conversion at the photoelectric conversion unit 42 of the image-capturing pixel 20A.

Figure 8B:
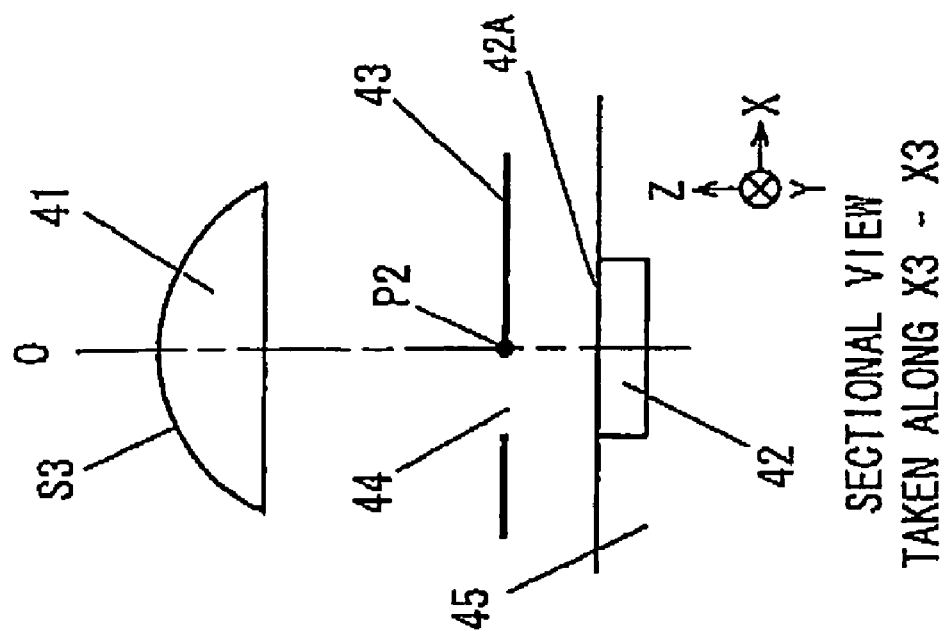
FIGS. 8A and 8B respectively present a plan view and a sectional view taken through X3-X3, each schematically illustrating the essential part of an AF pixel 20B.
Figure 8A:
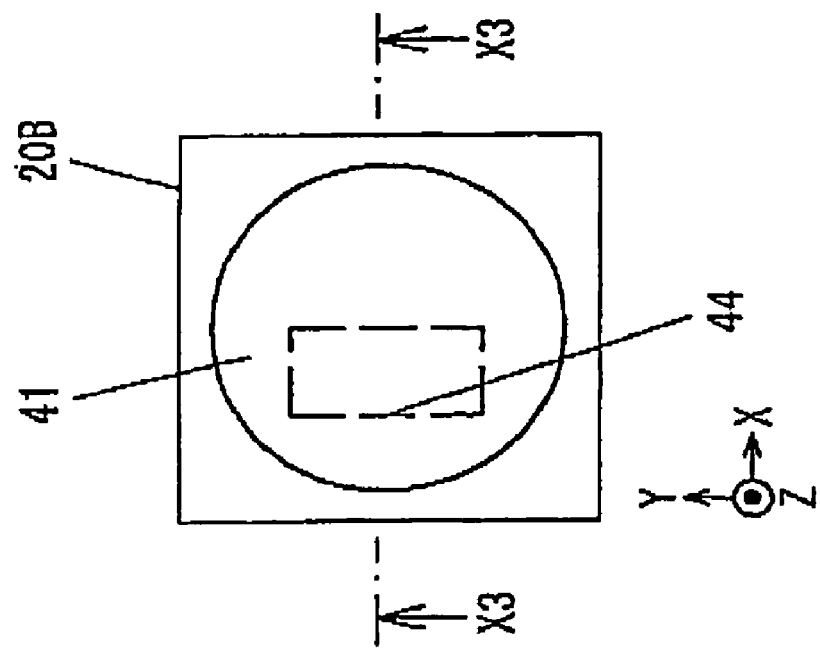

FIGS. 8A and 8B respectively present a plan view and a sectional view taken along X3-X3 in FIG. 8A, each showing the essential part of an AF pixel 20B. FIGS. 8A and 8B show a pixel among the AF pixels 20B disposed in the focus detection area 32 in FIG. 4, at which the incoming light is received on the left side of the optical axis. The same reference numerals are assigned to components identical to or corresponding to those in FIGS. 7A~7C and the following explanation focuses on elements different from those in FIGS. 7A~7C.

A light shield film 43 is disposed between the micro-lens 41 and the photoelectric conversion unit 42 at the AF pixel 20B, and one of the two split light fluxes, separated from each other through pupil splitting, enters the photoelectric conversion unit 42, unblocked by the light shield film 43. In addition, the micro-lens 41 assumes a circular shape in a plan view, as shown in FIG. 8A, and the micro-lens diameter is set smaller than that of the micro-lens 41 in FIG. 7A assuming a rectangular shape in the plan view. Thus, as long as the height of the micro-lens 41 (the micro-lens thickness) is set equal to that of the micro-lens 41 at the image-capturing pixel 20A in FIGS. 7B and 7C, the curvature of the micro-lens curved surface S3 is greater than either of the curvatures of the curved surfaces S1 and S2 shown in FIGS. 7B and 7C. This means that the light condensing position P2 at which light is condensed via the micro-lens 41 at the AF pixel 20B is further toward the micro-lens than the light condensing position P1 of the micro-lens 41 in the image-capturing pixel 20A. In the embodiment, the light condensing position P2 is set at a point substantially matching the position assumed by the light shield film 43.

The light shield film 43, disposed on the light-entry side of the AF pixel 20B, defines the area over which the incoming light enters the photoelectric conversion unit 42. More specifically, an opening 44 is formed at the light shield film 43 and this opening 44 defines the area over which the incoming light enters the photoelectric conversion unit 42. The opening 44 is formed on the −X side relative to the optical axis O (see FIG. 8B) of the micro-lens 41. Thus, a light flux from an exit pupil area substantially offset toward the +X side relative to the center of the exit pupil of the photographic lens 2 is selectively received to undergo photoelectric conversion at the photoelectric conversion unit 42.

It is to be noted that since the micro-lens disposed at the AF pixel 20B and the micro-lens disposed at the image-capturing pixel 20A assume shapes identical to each other in the related art, the light condensing position P2 of the AF pixel 20B and the light condensing position P1 of the image-capturing pixel 20A are exactly the same. In other words, light decentered toward the opposite side, too, enters the AF pixel 20B in the related art. At the solid-state image sensor 3 in the embodiment, however, the signal component decentered to the opposite side is reduced (to be described in detail later).

Likewise, among the AF pixels 20B shown in FIG. 4, an AF pixel 20B with an opening 44 formed on the right side (the +X side) of the optical axis selectively receives a light flux from an exit pupil area offset toward the −X side from the center of the exit pupil, an AF pixel 20B with an opening 44 formed on the upper side (the +Y side) of the optical axis selectively receives a light flux from an exit pupil area offset toward the −Y side from the center of the exit pupil and an AF pixel 20B with an opening 44 formed on the lower side (the −Y side) of the optical axis selectively receives a light flux from an exit pupil area offset toward the +Y side from the center of the exit pupil.

The focus calculation unit 10 that executes focus detection through the split-pupil phase difference method calculates a defocus amount indicating an extent of defocusing through correlation operation executed based upon AF signals from a plurality of AF pixels 20B that receive light fluxes from the exit pupil area offset toward the +X side and AF signals from a plurality of AF pixels 20B that receive light fluxes from the exit pupil area offset toward the −X side. It also executes focus detection based upon AF signals from a plurality of AF pixels 20B that receive light fluxes from the exit pupil area offset toward the +Y side and AF signals from a plurality of AF pixels 20B that receive light fluxes from the exit pupil area offset toward the −Y side.

It is crucial to detect light fluxes from the exit pupil areas assuming positions symmetrical to each other relative to the optical axis by clearly distinguishing those departing one exit pupil area from those departing the other, so as to assure highly accurate focus detection through the split-pupil phase difference method. At the same time, better image-capturing performance via each image-capturing pixel 20A must be assured by setting the light condensing position at which light is condensed via the micro-lens 41 to a point on the light-receiving surface or closer to the substrate However, solid-state image sensors in the related art are not configured by taking this into consideration and instead, micro-lenses 41 assuming identical shapes are optimal for image-capturing operation, are disposed both at the image-capturing pixels 20A and the AF pixels 20B. Thus, the focus detection accuracy cannot be maximized.

In the solid-state image sensor 3 achieved in the embodiment, the two requirements described above are satisfied by assuming different light condensing positions for the micro-lenses 41 at the image-capturing pixels 20A and the AF pixels 20B. Namely, the light condensing position P1 is set for each image-capturing pixel 20B at a point close to the light-receiving surface (more specifically, right on the light-receiving surface 42A or a point further toward the substrate 45 relative to the light-receiving surface 42A, as shown in FIG. 7B and 7C) optimal for the image-capturing operation, whereas the light condensing position P2 is set for each AF pixel 20B at a position on the light shield film 43 further toward the micro-lens relative to the light-receiving surface, so as to reliably ensure that only one of the two split light fluxes, separated from each other through pupil splitting, is received.

Figure 9:
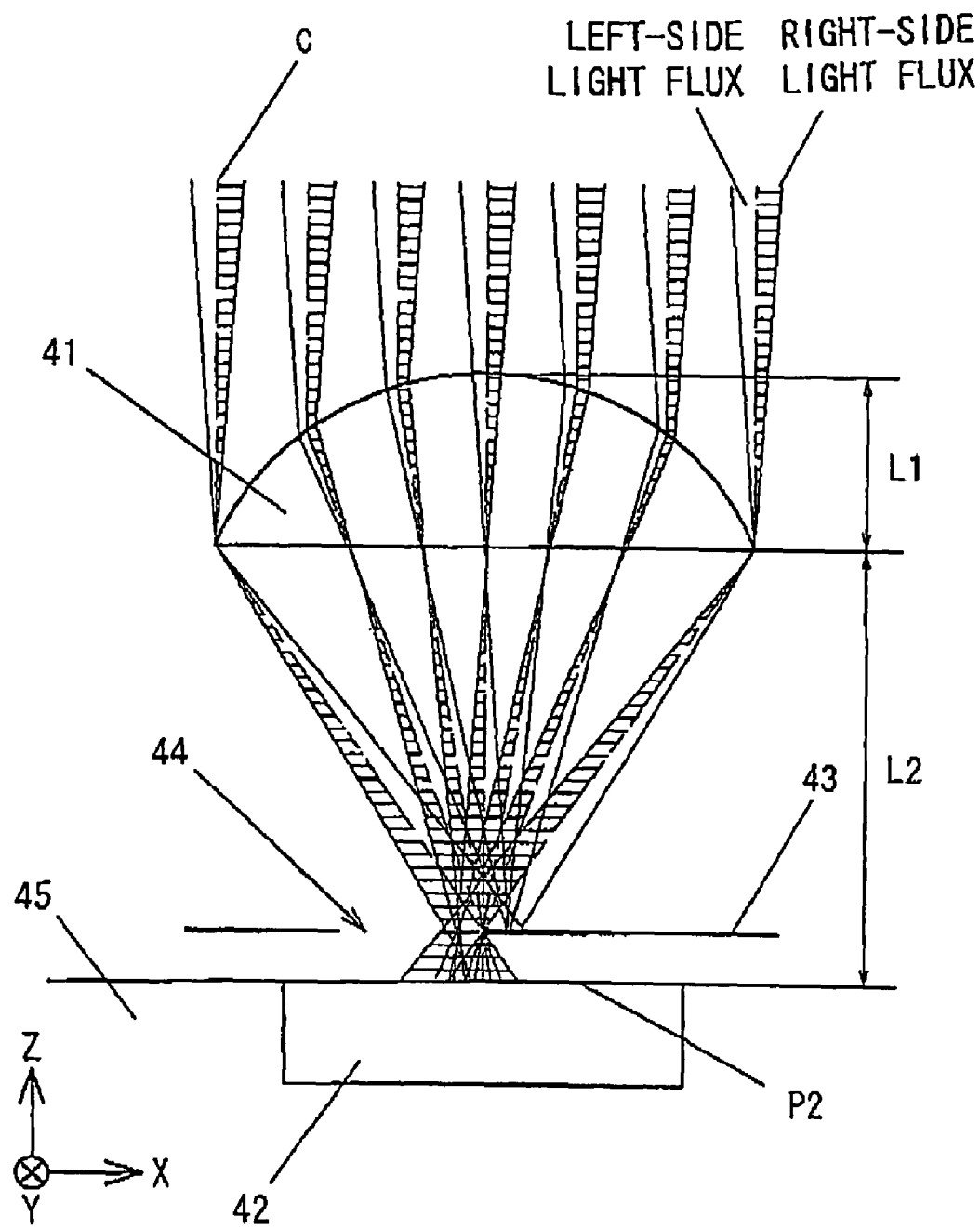
FIG. 9 illustrates light fluxes received at the AF pixel 20B

FIG. 9 illustrates light fluxes received at an AF pixel 20B. In FIG. 9, the light fluxes drawn with horizontal stripes are the light fluxes that enter the light-receiving surface, whereas the light fluxes without stripes indicate light fluxes that do not reach the light-receiving surface. In addition, each light flux on the right side of a one-point chain line is a light flux advancing from the exit pupil area offset to the right (toward the +X side) from the center of the exit pupil, whereas each light flux on the left side of the one-point chain line is a light flux advancing from the exit pupil area offset to the left (toward the −X side) from the center of the exit pupil. The light fluxes from the left-side exit pupil area are all blocked at the light shield film 43 and only the light fluxes having advanced from the right-side exit pupil area enter the photoelectric conversion unit 42. As a result, accurate focus detection can be executed through the split-pupil phase difference method.

Figure 10:
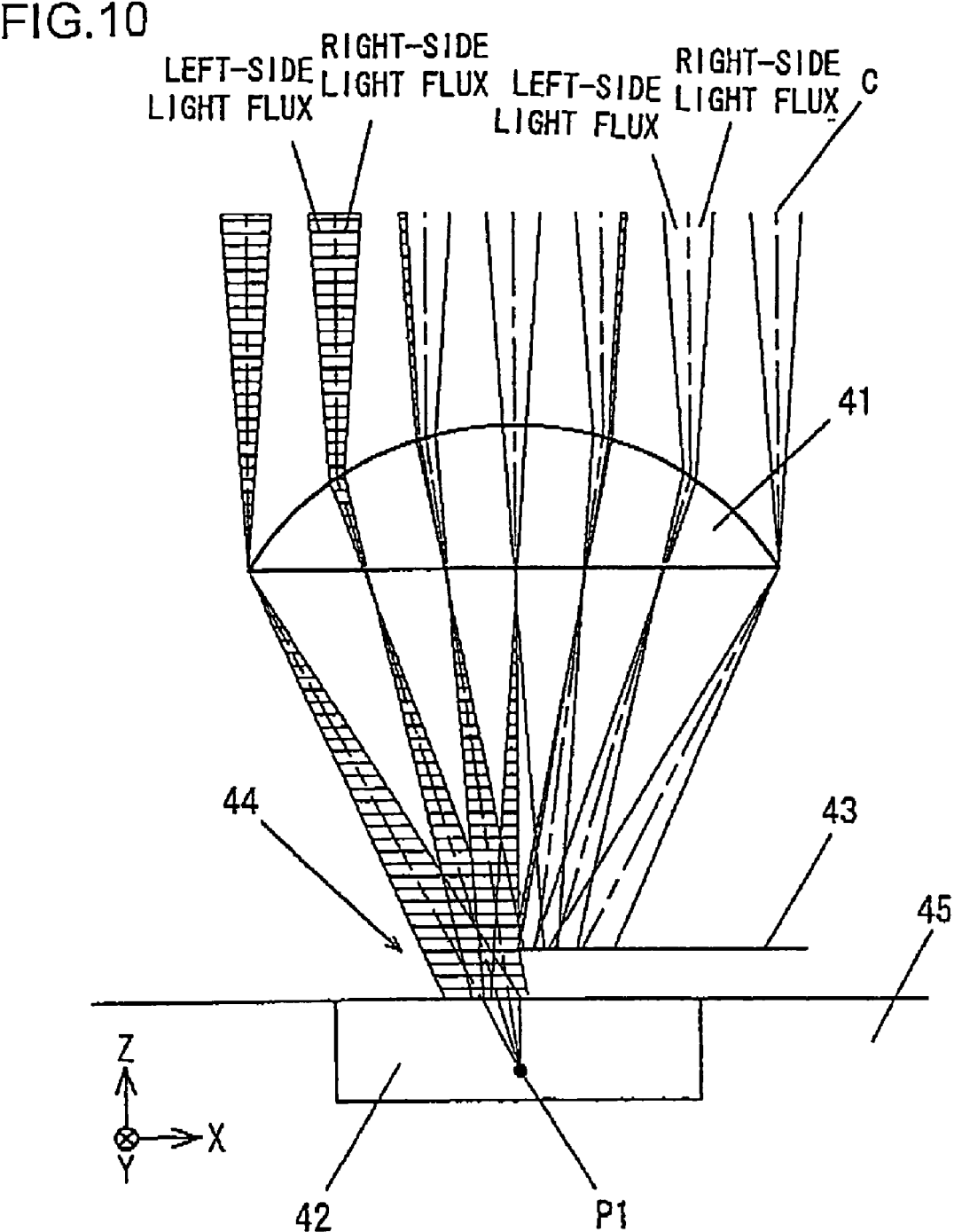
FIG. 10 illustrates the light fluxes received at an AF pixel 20B assuming a structure in the related art.

FIG. 10 shows an AF pixel 20B in the related art. The AF pixel in the related art includes a light shield film 43 disposed at a pixel structured identically to the image-capturing pixel 20A described earlier. The image-capturing pixel 20A assumes a light condensing position P1 set toward the substrate and near the light-receiving surface, so as to assure desirable image-capturing characteristics. However, if the same pixel is used as an AF pixel simply by disposing a light shield film 43, as shown in FIG. 10, light fluxes from the left-side exit pupil area, too, pass through the opening 44 and enter the photoelectric conversion unit 42 since the light condensing position P1 is near the light-receiving surface. In addition, there are light fluxes advancing from the right-side exit pupil area, which are blocked at the light shield film 43. As a result, the phase difference AF performance is bound to be compromised in the related art.

At the solid-state image sensor 3 in the embodiment, different optimal positions at which light is condensed via the micro-lenses 41, are assumed for the image-capturing pixels 20A and the AF pixels 20B, so as to assure desirable image-capturing characteristics and desirable AF characteristics at the same time.

It is to be noted that while the micro-lenses 41 at the image-capturing pixels 20A assume a rectangular shape, identical to the shape of the pixels in the plan view, and the micro-lenses at the AF pixels 20B assume a circular shape in the plan view in the embodiment described above, the micro-lenses at the pixels may assume shapes other than these. Namely, when micro-lenses with a uniform thickness are used, the curvature of a micro-lens curved surface can be increased, so as to set the light condensing position P2 of the AF pixel 20B further toward the micro-lens than the light condensing position P1 set for the image-capturing pixel 20A. For instance, the micro-lens 41 at the AF pixel 20B may assume a polygonal shape with at least eight sides in the plan view, very close to a circular shape, whereas the micro-lens 41 at the image-capturing pixel 20A may assume a polygonal shape with fewer than eight sides in the plan view.

Methods commonly adopted when forming on-chip micro-lenses 41 include the reflow method (see, for instance, Japanese Patent No. 2604890) and the etch-back method (see, for instance, Japanese Patent No. 2776810). For instance, a convex micro-lens 41, achieving curvatures such as those shown in FIG. 7, can be formed through the reflow method by heating a rectangular-patterned micro-lens material (thermoplastic resin) and thus thermally deforming the micro-lens material. By using a micro-lens material patterned with equilateral hexagonal shapes instead of rectangles, micro-lenses 41 assuming an equilateral hexagonal shape in the plan view can be obtained.

The circular micro-lens 41 at the AF pixel 20B in FIGS. 8A and 8B, on the other hand, can be obtained by reflowing a circular-patterned micro-lens material. It is to be noted that since micro-lenses 41 are formed through thermal deformation of the micro-lens material, the rectangular micro-lenses 41 do not actually achieve a perfectly rectangular shape. Instead they assume a shape with rounded corners in the plan view. Micro-lenses 41 described to assume a rectangular shape in the plan view may actually have rounded corners or beveled corners. This allowance is applicable when micro-lenses 41 assume another polygonal shape as well.

While different light condensing position P1 and P2 are assumed by altering the shape of the micro-lens in the plan view in the embodiment described above, the light condensing position may be adjusted through a method other than this. For instance, different light condensing positions may be set for micro-lenses assuming identical shapes and identical sizes in the plan view simply by altering the micro-lens thickness. Alternatively, different light condensing positions may be set for micro-lenses assuming identical shapes (e.g., circular) in the plan view and equal micro-lens thicknesses, i.e., for micro-lenses assuming identical shapes, simply by altering the diameter. As a further alternative, the light condensing positions may be adjusted by using micro-lens materials with varying refractive indices, instead of altering the shapes of the micro-lenses. Micro-lens materials with varying refractive indices may be phenol positive photoresist that contains naphthoquinone diazide as the photosensitive group (to be used in the reflow method, or silicon oxide or silicon nitride (to be used in the etch-back method).

FIG. 11 presents a list of the methods that may be adopted to adjust the light condensing position as described above. Assuming that the micro-lenses all have identical shapes in the plan view, the light condensing position P2 of the AF pixel 20B can be adjusted towards the micro-lens by increasing the micro-lens thickness. When the micro-lenses assume the uniform thickness, on the other hand, the light condensing position P2 of the AF pixel 20B can be adjusted toward the micro-lens side by reducing the micro-lens diameter or by increasing the refractive index of the micro-lens material.

When one of the two split light fluxes, separated from each other through pupil splitting, is received through the opening 44 formed at the light shield film 43, the desirable position at which the light is condensed is the position P2 on the light shield film 43, as described earlier. As the light condensing position is set apart from the position P2 by a greater extent, the performance level of the phase difference AF executed based upon the signal output from the photoelectric conversion unit 42 becomes lower. FIG. 12 presents the results of optical simulations of phase difference AF performance levels (each represented by a phase difference AF signal effectiveness factor) corresponding to three different types of micro-lenses 41.

The phase difference AF signal effectiveness factor may indicate a value calculated by, for instance, allowing light fluxes advancing from the exit pupil area offset to the right (toward the +X side) from the exit pupil center, as shown in FIG. 9 to enter an AF pixel 20B (see FIG. 4) with the opening 44 thereof offset to the left relative to the optical axis, as shown in FIG. 9 to detect the right-side light fluxes and also to enter an AF pixel 20B (see FIG. 4) with the opening 44 thereof offset to the right relative to the optical axis to detect the left-side light fluxes and determining the intensity ratio of the detection signals indicating the intensity levels of the light fluxes having entered the AF pixels. Namely, the phase difference AF signal effectiveness factor assumes a value in proportion to (output from the right-side light flux detection pixel 20B) (output from the left-side light flux detection pixel 20B). When the phase difference AF signal effectiveness factor assumes a greater value, a higher level of phase difference AF performance is achieved.

The value of the ratio (output from the right-side light flux detection pixel 20B)/(output from the left-side light flux detection pixel 20B), calculated in conjunction with the AF pixels assuming a light condensing position identical to that of the image-capturing pixels 20A, as shown in FIG. 10, is now considered. As explained earlier, the light fluxes drawn with horizontal stripes reach the light-receiving surface, whereas the non-striped light fluxes are blocked at the light shield film 43 and thus do not enter the light-receiving surface. In this situation, some of the right-side light fluxes that should be detected at the right-side light flux detection pixel 20B shall be blocked at the light shield film 43, which reduces the value assumed for the numerator in the phase difference AF signal effectiveness factor, ultimately reducing the phase difference AF signal effectiveness factor. In addition, as shown in FIG. 10, light fluxes (left-side light fluxes) advancing from the pupil area on the opposite side, which should not enter the right-side light flux detection pixel at all, shall enter the pixel. This means that right-side light fluxes also enter the left-side light flux detection pixel 20B. As a result, the denominator in the phase difference AF signal effectiveness factor increases to result in smaller value assumed for the phase difference AF signal effectiveness factor. Thus, if the light condensing position is the same as that assumed for the image-capturing pixels 20A, as shown in FIG. 10, the phase difference AF signal effectiveness factor is reduced.

The results of the optical simulations (optical condition set for the photographic lens 10: F2.8 (on-axis), AF pixel condition: micro-lenses assume a circular shape in the plan view) presented in FIG. 12 indicate that the phase difference AF signal effectiveness factor calculated in correspondence to the micro-lens structure ideal for image-capturing, such as that shown in FIG. 10, assumed a small value of 4.3. When the opening diameter at the micro-lens 41 is reduced by 10% without altering the micro-lens thickness, the micro-lens curved surface assumes a greater curvature and the light condensing position moves toward the micro-lens from the point P1 in FIG. 10, improving the phase difference AF signal effectiveness factor to 10.9. In addition, by increasing the micro-lens thickness by 10% without altering the micro-lens diameter, the phase difference AF signal effectiveness factor is increased to 9.7, achieving better phase difference AF performance over that achieved in the structure shown in FIG. 10.

Figure 13:
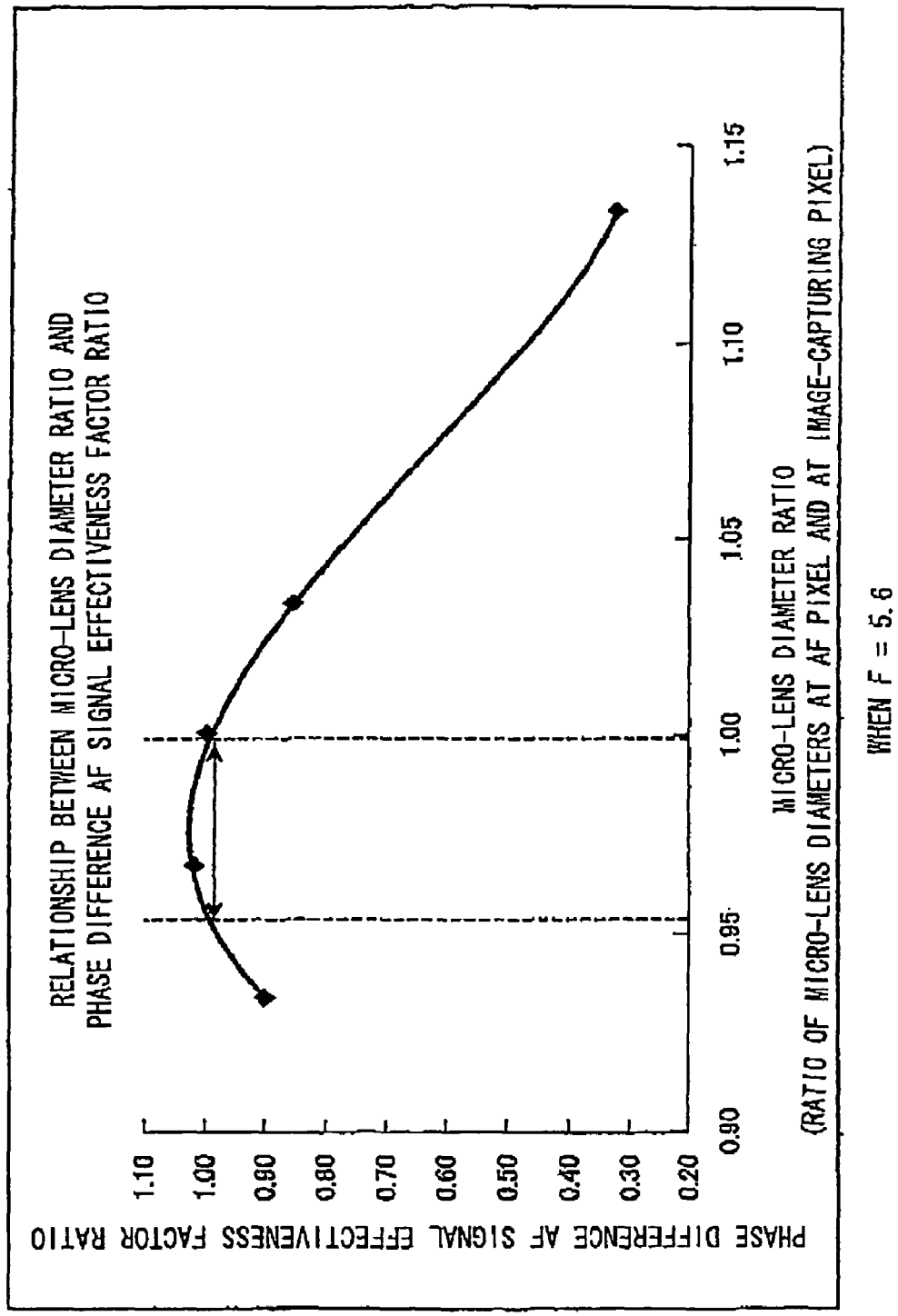
FIG. 13 shows the relationship between the diameter ratio of the micro-lens 41 and the phase difference AF signal effectiveness factor ratio.
Figure 14:
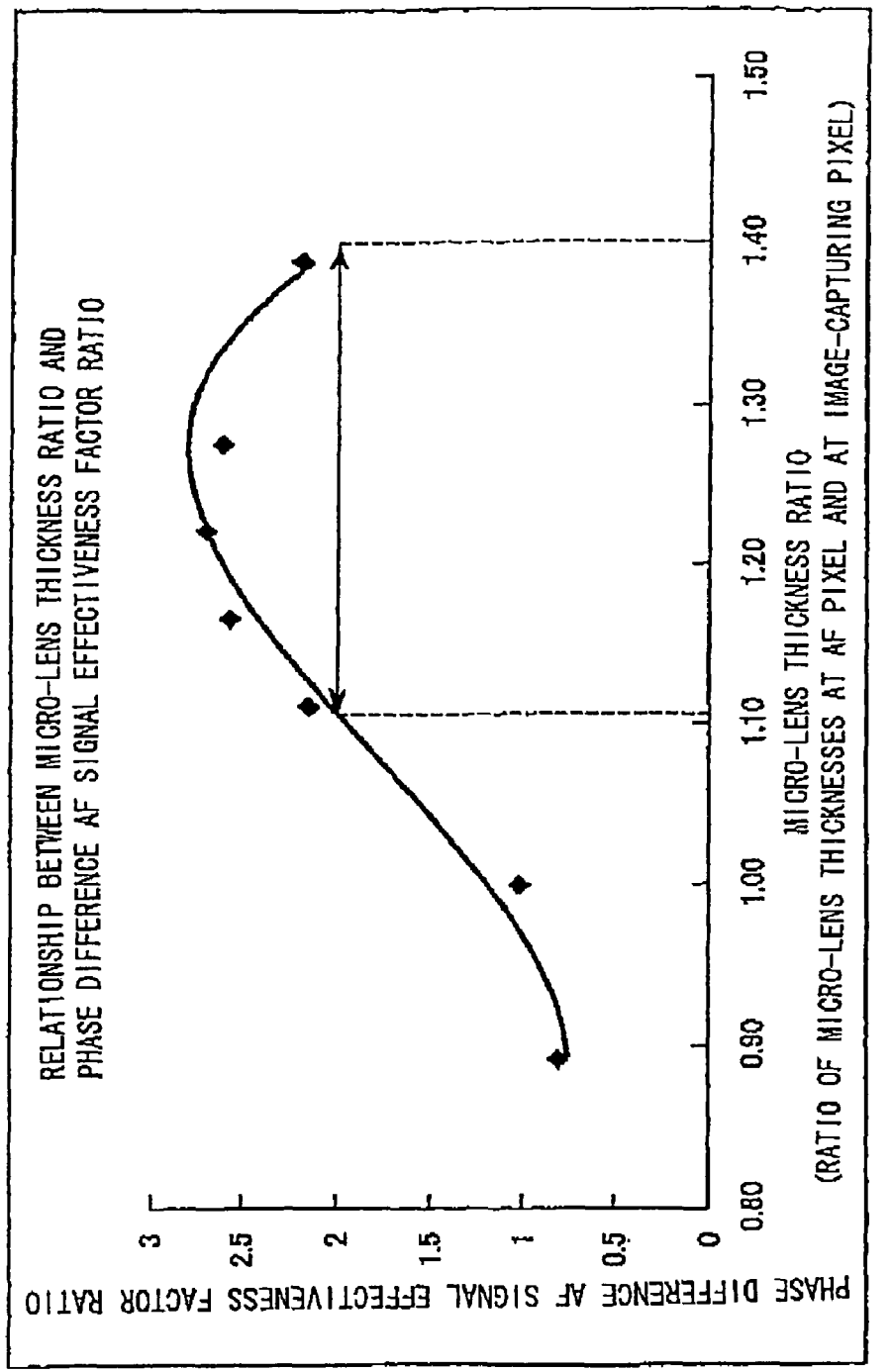
FIG. 14 shows the relationship between the thickness ratio of the micro-lens 41 and the phase difference AF signal effectiveness factor ratio.
Figure 15:
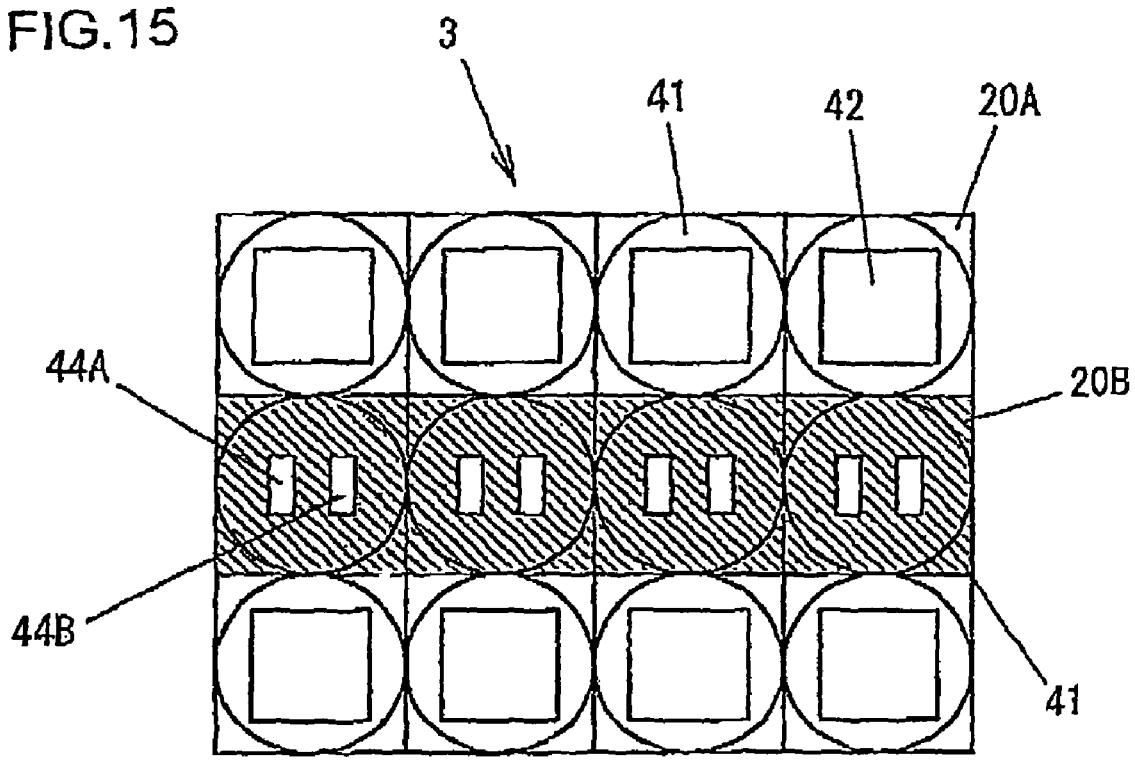
FIG. 15 presents a plan view showing part of a solid-state image sensor 3 that includes pixels 20B, at each of which a pair of openings 44A and 44B corresponding to different pupil areas are formed.

FIG. 13 shows the relationship between the diameter ratio of the micro-lens 41 at an AF pixel 20B and the phase difference AF signal effectiveness factor ratio. Each ratio takes on a relative value representing the ratio of the value corresponding to the micro-lens 41 at the AF pixel to the value corresponding to of the micro-lens at the image-capturing pixel 20A. When the micro-lens diameter ratio is equal to or greater than 0.95 and less than 1.0, the phase difference AF signal effectiveness factor ratio is greater than 1.0, indicating an improvement in the phase difference AF performance over the related art. FIG. 14 shows the relationship between the micro-lens thickness ratio and the phase difference AF signal effectiveness factor ratio. When the micro-lens thickness ratio is set equal to or greater than 1.10 and less than 1.40, the phase difference AF signal effectiveness factor ratio assumes a value equal to or greater than 2, achieving a greater extent of improvement in the phase difference AF performance over that achieved by altering the diameter of the micro-lens 41, as shown in FIG. 13. Accordingly, this may be regarded as the ideal approach to be taken in conjunction with the micro-lens at the AF pixel 20B.

It is to be noted that the light condensing position may be adjusted even more effectively by using a lens material with a greater refractive index to constitute the micro-lens 41 at the AF pixel 20B, as well as adjusting the diameter or the thickness of the micro-lens 41. It shall also be obvious that the light condensing position may be adjusted through a combination of these means.

In the embodiment described above, the light condensing position of the AF pixel 20B is adjusted toward the micro-lens by altering the diameter, the thickness or the refractive index of the micro-lens 41. However, simply by adjusting the distance L2 between the lower end of the micro-lens 41 and the light-receiving surface of the photoelectric conversion unit 42 shown in FIG. 9, the light condensing position can be shifted without having to alter the shape or material of the micro-lens 41. Since the light condensing position is also affected by the micro-lens thickness L1, as explained earlier, a specific L2/L1, which shall optimize the micro-lens 41 for the AF pixel 20B, can be determined.

Figure 16:
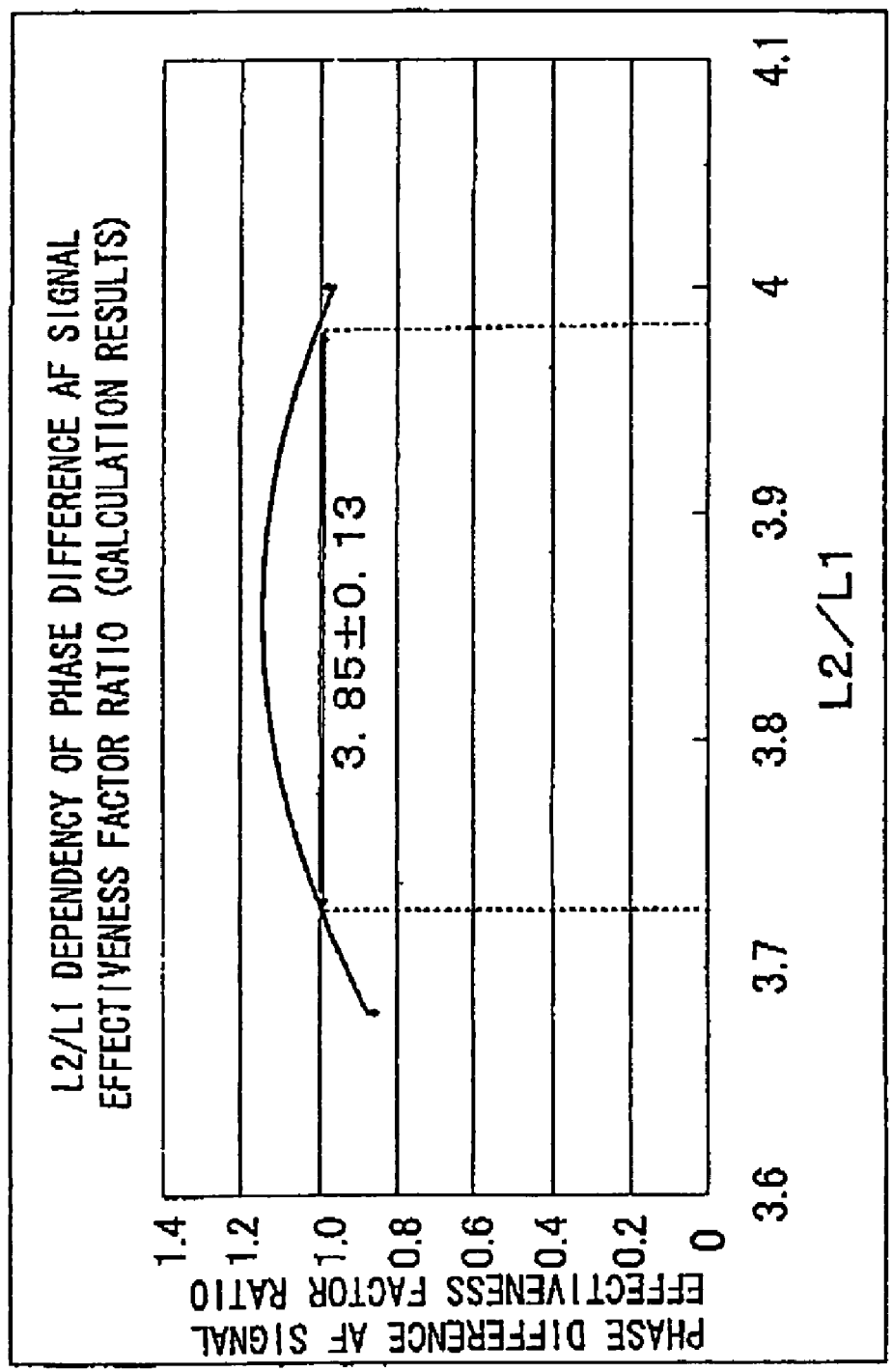
FIG. 16 presents a graph indicating the L2/L1 dependency of the phase difference AF signal effectiveness factor ratio.

FIG. 16 presents the results of simulations related to the L2/L1 dependency of the phase difference AF signal effectiveness factor ratio. It is to be noted that the phase difference AF signal effectiveness factor ratio in FIG. 16 is calculated in reference to the phase difference AF signal effectiveness factor of a micro-lens 41 that would assure the optimal autofocus performance, e.g., the phase difference AF signal effectiveness factor of a micro-lens 41 that would assure a phase difference AF signal effectiveness factor ratio of 2 in FIG. 14. In addition, the simulations are conducted in conjunction with a micro-lens (with a circular shape in the plan view) identical in shape to that used in the image-capturing pixel 20A.

The simulation results presented in FIG. 16 indicate that when L2/L1 is equal to or greater than 3.72 and equal to or less than 3.98, the phase difference AF signal effectiveness factor ratio is equal to or greater than 1, achieving the optimal autofocus performance. Namely, when the micro-lens 41 has a shape identical to that of the micro-lens at the image-capturing pixel 20A, L2/L1 should be set equal to or greater than 3.72 and equal to or less than 3.98. While FIG. 16 presents the results of simulations related to a micro-lens assuming a specific shape, a micro-lens with another shape shall demonstrate similar L2/L1 dependency and thus, shall indicate a similar phase difference AF signal effectiveness actor ratio. It is to be noted that since better AF sensitivity is assured with a micro-lens 41 with a greater diameter, the micro-lens 41 should assume a diameter close to the size of the pixel itself.

As explained above, the light condensing position can also be adjusted by altering the distance L2 between the lower end of the micro-lens 41 and the light-receiving surface of the photoelectric conversion unit 42 in FIG. 9. Accordingly, the distance between the lower end of the micro-lens 41 and the light-receiving surface of the photoelectric conversion unit 42 may take on different values at the image-capturing pixel 20A and the AF pixel 20B. In addition, by shifting the light condensing position of the AF pixel 20B toward the micro-lens through adjustment of the diameter, the thickness or the refractive index of the micro-lens 41, the micro-lens 41 of the image-capturing pixel 20A and the micro-lens 41 of the AF pixel 20B can be disposed on a single plane.

In the embodiment described above, the light condensing position P1 of the micro-lens 41 at the image-capturing pixel 20A is set near the light-receiving surface as in the related art whereas the light condensing position P2 of the micro-lens 41 at the AF pixel 20B is adjusted further toward the micro-lens by altering the shape of the micro-lens 41 in the plan view, the thickness of the micro-lens 41 or the like. As a result, the AF performance through the split-pupil phase difference method is improved and desirable image-capturing performance and desirable AF performance are assured at the same time.

It is to be noted that an explanation is given above in reference to the embodiment on an example in which the present invention is adopted in the solid-state image sensor 3, which includes AF pixel 20B each having an opening 44 thereof set on the left side and AF pixels 20B each having an opening 44 thereof set on the right side to be paired up with a left-side opening, alternately disposed along the X direction. However, the present invention is not limited to this example and may be adopted equally effectively in a structure that includes AF pixels 20B each having a pair of openings 44A and 44B corresponding to different pupil areas. The AF pixels 20B in such a structure should include photoelectric conversion units each corresponding to one of the openings 44A and 44B, so that AF signals corresponding to the two openings 44A and 44B are output without interfering with each other. Furthermore, the present invention may be adopted in an image-capturing device such as a video camera that executes focus detection by calculating the defocus amount, instead of an electronic camera.

The above described embodiments are examples, and various modifications can be made without departing from the scope of the invention.

What is claimed is:
1. A solid-state image sensor, comprising:
   a plurality of image-capturing pixels, each equipped with a first micro-lens used to condense light; and
   a plurality of focus detection pixels engaged in focus detection, each equipped with a second micro-lens used to condense light;
   the plurality of image-capturing pixels and the plurality of focus detection pixels being disposed in a two-dimensional array, wherein:
   the first micro-lens and the second micro-lens are formed so that a light condensing position at which light is condensed via the second micro-lens is set further toward a micro-lens side than the light condensing position at which light is condensed via the first micro-lens.

2. A solid-state image sensor according to claim 1, wherein:
   the plurality of image-capturing pixels and the plurality of focus detection pixels each include a photoelectric converter;
   the photoelectric converter of each of the plurality of image-capturing pixels and the photoelectric converter of each of the plurality of focus detection pixels are disposed on a single plane; and
   the first micro-lens and the second micro-lens are disposed on a single plane.

3. A solid-state image sensor according to claim 1, wherein:
the plurality of image-capturing pixels and the plurality of focus detection pixels each include a photoelectric converter;
the plurality of focus detection pixels each include a light shield member with an opening formed therein;
the light shield member is disposed between the photoelectric converter and the second micro-lens; and
the light condensing position at which light is condensed via the second micro-lens is set on a plane on which the light shield member is disposed.

4. A solid-state image sensor according to claim 1, wherein:
the light condensing position of the second micro-lens is adjusted toward the micro-lens side relative to the light condensing position of the first micro-lens by setting a greater curvature for a lens surface of the second micro-lens than a curvature of a lens surface of the first micro-lens.

5. A solid-state image sensor according to claim 4, wherein:
the greater curvature of the lens surface of the second micro-lens than the curvature of the lens surface of the first micro-lens is set by setting a lens thickness of the second micro-lens to be greater than a lens thickness of the first micro-lens.

6. A solid-state image sensor according to claim 5, wherein:
provided that a uniform lens diameter is assumed, a ratio of the lens thickness of the second micro-lens and the lens thickness of the first micro-lens is set equal to or greater than 1.1 and less than 1.4.

7. A solid-state image sensor according to claim 4, wherein:
the greater curvature of the lens surface of the second micro-lens than the curvature of the lens surface of the first micro-lens is set by setting a lens diameter of the second micro-lens to be smaller than a lens diameter of the first micro-lens.

8. A solid-state image sensor according to claim 7, wherein:
provided that a uniform lens thickness is assumed, a ratio of the lens diameter of the second micro-lens and the lens diameter of the first micro-lens is set equal to or greater than 0.95 and less than 1.0.

9. A solid-state image sensor according to claim 4, wherein:
the greater curvature of the lens surface of the second micro-lens than the curvature of the lens surface of the first micro-lens is set by forming the second micro-lens in a circular shape in a plan view and forming the first micro-lens in a rectangular shape in a plan view.

10. A solid-state image sensor according to claim 4, wherein:
the greater curvature of the lens surface of the second micro-lens than the curvature of the lens surface of the first micro-lens is set by forming the second micro-lens in a polygonal shape with at least eight sides in a plan view and forming the first micro-lens in a polygonal shape with seven or fewer sides in a plan view.

11. A solid-state image sensor according to claim 1, wherein:
the light condensing position of the second micro-lens is adjusted toward the micro-lens side relative to the light condensing position of the first micro-lens by setting a greater refractive index for a lens material constituting the second micro-lens than a refractive index for a lens material constituting the first micro-lens.

12. A solid-state image sensor according to claim 1, wherein:
with $L1$ representing a thickness of the micro-lens and $L2$ representing a distance between the micro-lens and a light-receiving surface of a pixel at which the micro-lens is disposed, a ratio $L2/L1$ is set to different values for the first micro-lens and the second micro-lens so that the light condensing position of the second micro-lens is adjusted further toward the micro-lens side than the light condensing position of the first micro-lens.

13. A solid-state image sensor according to claim 12, wherein:
the ratio $L2/L1$ for the second micro-lens is set equal to or greater than 3.72 and equal to or less than 3.98.

14. An image-capturing device, comprising:
a solid-state image sensor according to claim 1;
a photographic lens;
an image forming unit that forms image information based upon outputs from the plurality of image-capturing pixels; and
a focus detection unit that executes focus detection through a split-pupil phase difference method based upon outputs from the plurality of focus detection pixels.

* * * * *